US011499983B2

(12) United States Patent
Nobuki et al.

(10) Patent No.: US 11,499,983 B2
(45) Date of Patent: Nov. 15, 2022

(54) AUTOMATIC ANALYSIS APPARATUS AND METHOD FOR CONTROLLING AUTOMATIC ANALYSIS APPARATUS

(71) Applicant: Hitachi High-Tech Corporation, Tokyo (JP)

(72) Inventors: Shunichirou Nobuki, Tokyo (JP); Koshin Hamasaki, Tokyo (JP); Taku Sakazume, Tokyo (JP); Yoshihiro Yamashita, Tokyo (JP); Hidetsugu Tanoue, Tokyo (JP); Tatsuki Takakura, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 261 days.

(21) Appl. No.: 16/956,665

(22) PCT Filed: Nov. 19, 2018

(86) PCT No.: PCT/JP2018/042686
§ 371 (c)(1),
(2) Date: Jun. 22, 2020

(87) PCT Pub. No.: WO2019/146227
PCT Pub. Date: Aug. 1, 2019

(65) Prior Publication Data
US 2020/0319218 A1 Oct. 8, 2020

(30) Foreign Application Priority Data
Jan. 26, 2018 (JP) .............................. JP2018-011947

(51) Int. Cl.
*G01N 35/00* (2006.01)
*G01N 21/76* (2006.01)
*G01N 21/27* (2006.01)
*G01J 1/02* (2006.01)
(Continued)

(52) U.S. Cl.
CPC ...... *G01N 35/00623* (2013.01); *G01J 1/0228* (2013.01); *G01N 21/76* (2013.01);
(Continued)

(58) Field of Classification Search
CPC ............. G01N 35/00623; G01N 21/76; G01N 21/274; G01N 2201/062; G01N 2201/067;
(Continued)

(56) References Cited

U.S. PATENT DOCUMENTS 5,105,092 A * 4/1992 Natsubori .............. G01N 21/94
356/237.2
2001/0016330 A1* 8/2001 Owicki ................... G01N 21/76
435/7.9
(Continued)

FOREIGN PATENT DOCUMENTS

JP 3-120445 A 5/1991
JP 3-132644 A 6/1991
(Continued)

OTHER PUBLICATIONS

Translation of JPH07159405A, Yamada, Takashi, Jun. 23, 1995 (Year: 1995).*
(Continued)

*Primary Examiner* — Samuel P Siefke
*Assistant Examiner* — Henry H Nguyen
(74) *Attorney, Agent, or Firm* — Crowell & Moring LLP

(57) ABSTRACT

[Task] To provide an automatic analysis apparatus including a photomultiplier tube which controls a sensitivity of the photomultiplier tube without adjusting a high voltage value. [Solution] An automatic analysis apparatus according to the present invention includes a photomultiplier tube which detects light from a reaction vessel; a determination unit which determines an output signal of the photomultiplier
(Continued)

tube in a case where the photomultiplier tube is irradiated with first light; and a control unit which irradiates the photomultiplier tube with second light to lower a sensitivity of the photomultiplier tube in accordance with a determination result by the determination unit.

14 Claims, 9 Drawing Sheets

(51) Int. Cl.
　　　*G01J 1/44*　　　(2006.01)
　　　*G01J 1/08*　　　(2006.01)
(52) U.S. Cl.
　　　CPC ... *G01J 2001/086* (2013.01); *G01J 2001/444* (2013.01); *G01J 2001/4453* (2013.01); *G01N 21/274* (2013.01); *G01N 2201/062* (2013.01); *G01N 2201/067* (2013.01)
(58) Field of Classification Search
　　　CPC .......... G01N 2035/0444; G01J 1/0228; G01J 2001/086; G01J 2001/444; G01J 2001/4453; G01J 1/42; G01J 2001/4406; G01J 1/0295; G01J 1/0418; G01J 1/044; G01J 1/08
　　　See application file for complete search history.

(56) References Cited

U.S. PATENT DOCUMENTS

| | | |
|---|---|---|
| 2012/0046884 A1 | 2/2012 | Oka et al. |
| 2012/0114525 A1 | 5/2012 | Sakazume et al. |
| 2019/0346364 A1* | 11/2019 | Brunelle .................. G01J 3/10 |

FOREIGN PATENT DOCUMENTS

| | | | |
|---|---|---|---|
| JP | H07159405 A | * | 6/1995 |
| JP | 2000-46734 A | | 2/2000 |
| JP | 2002156713 A | * | 5/2002 |
| JP | 2010-175415 A | | 8/2010 |
| JP | 2010-203776 A | | 9/2010 |
| JP | 2011-137678 A | | 7/2011 |
| JP | 6171775 B2 | | 8/2017 |

OTHER PUBLICATIONS

Translation of JP6171775B2, Noda, Tetsuya, Aug. 2, 2017 (Year: 2017).*
Translation of JP2011137678A, Oku, Mizuki, Jul. 14, 2011 (Year: 2011).*
Translation of JP2002156713A, Iwakiri Naoto, May 31, 2002 (Year: 2002).*
International Search Report (PCT/ISA/210) issued in PCT Application No. PCT/JP2018/042686 dated Feb. 5, 2019 with English translation (five (5) pages).
Japanese-language Written Opinion (PCT/ISA/237) issued in PCT Application No. PCT/JP2018/042686 dated Feb. 5, 2019 (three (3) pages).
Extended European Search Report issued in European Application No. 18902928.3 dated Aug. 25, 2021 (eight (8) pages).

* cited by examiner

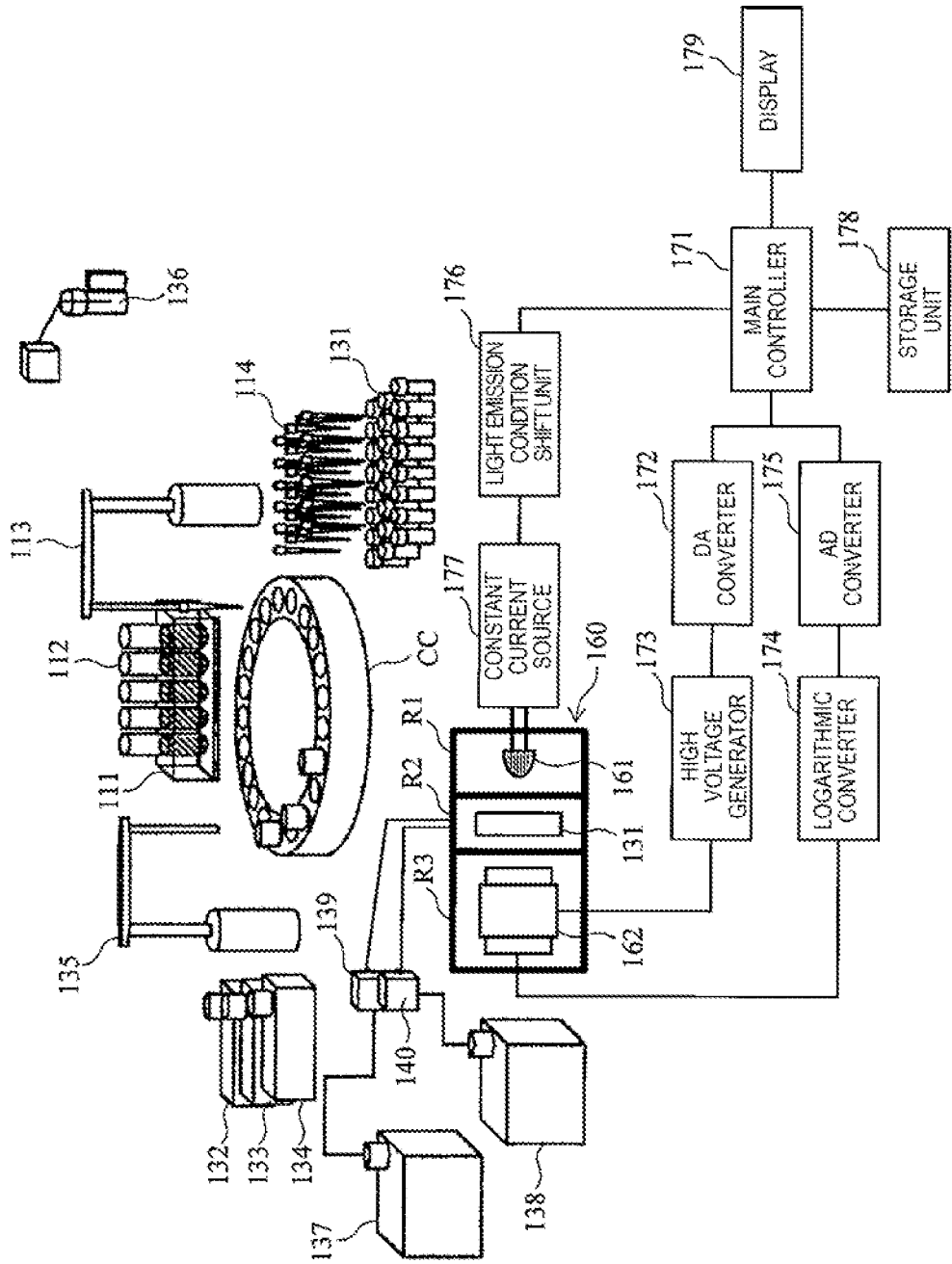
[Fig. 1]

[Fig. 2]
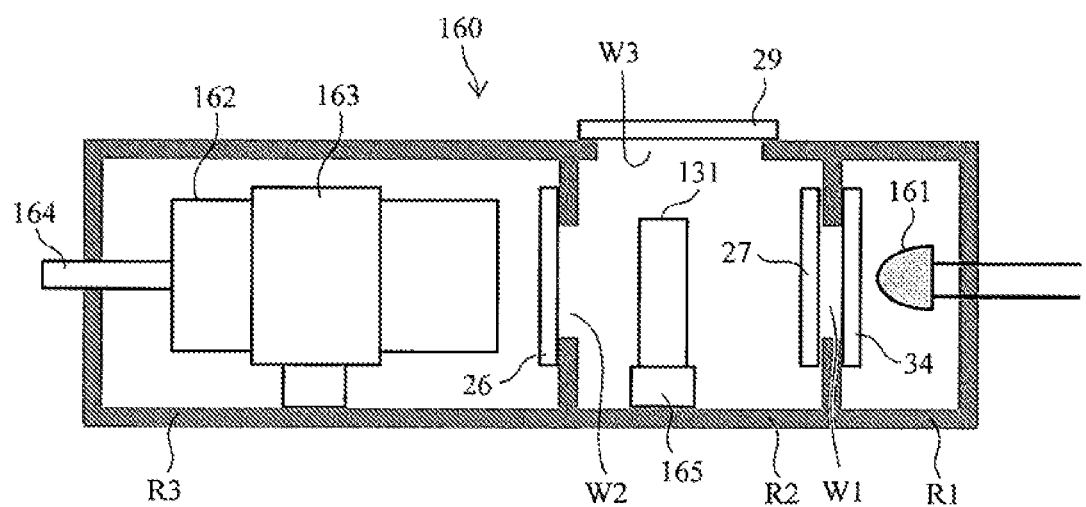

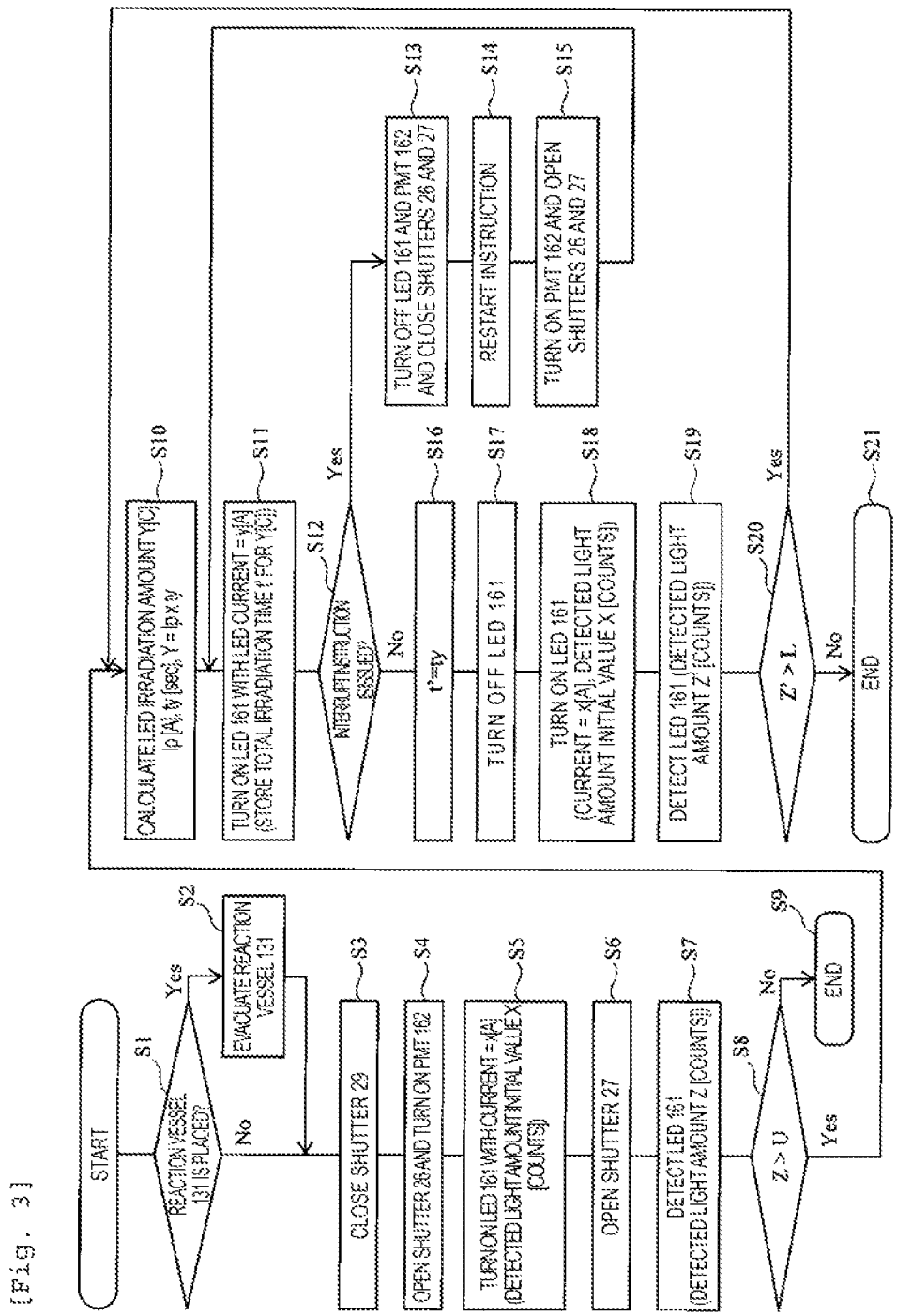
[Fig. 3]

[Fig. 4]
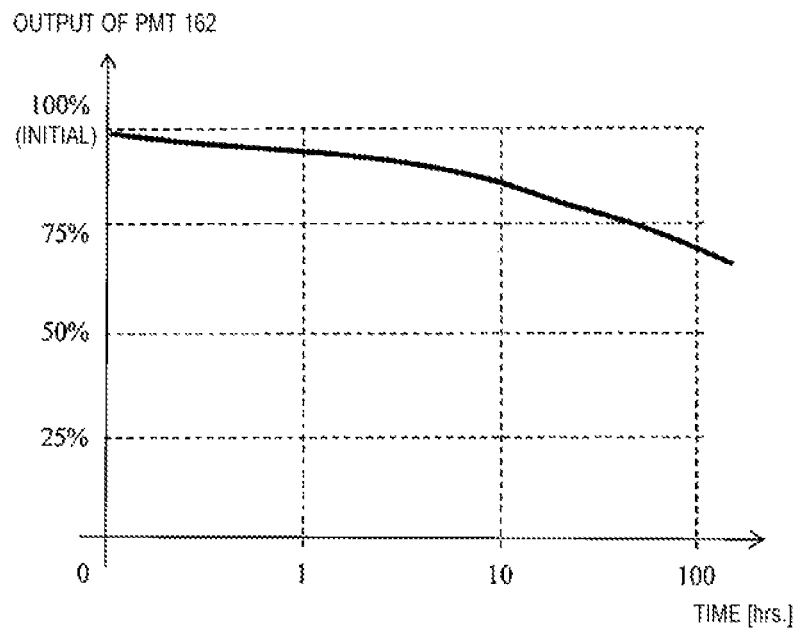
[Fig. 5]
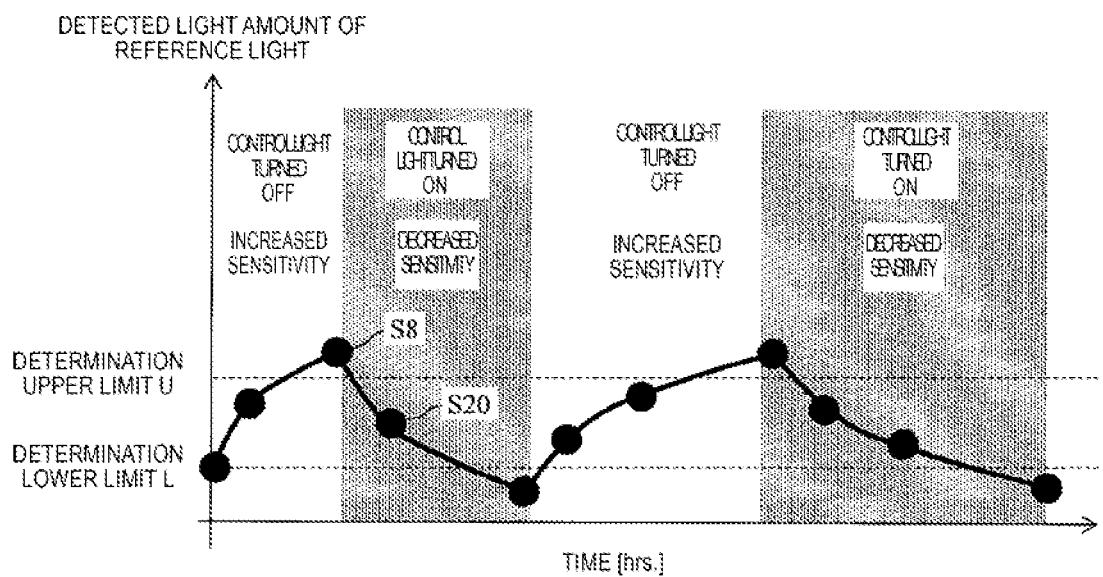

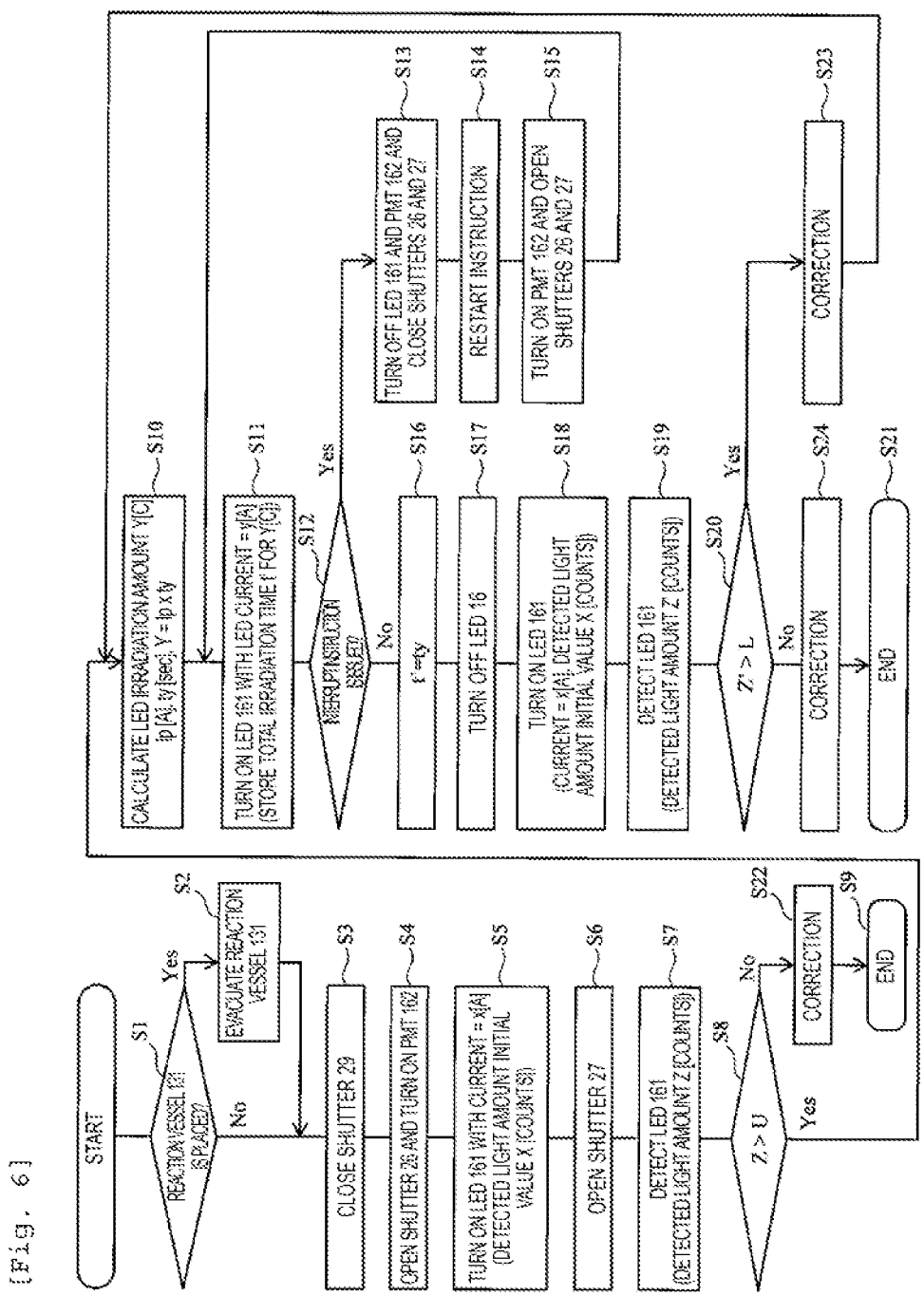
[Fig. 6]

[Fig. 7]
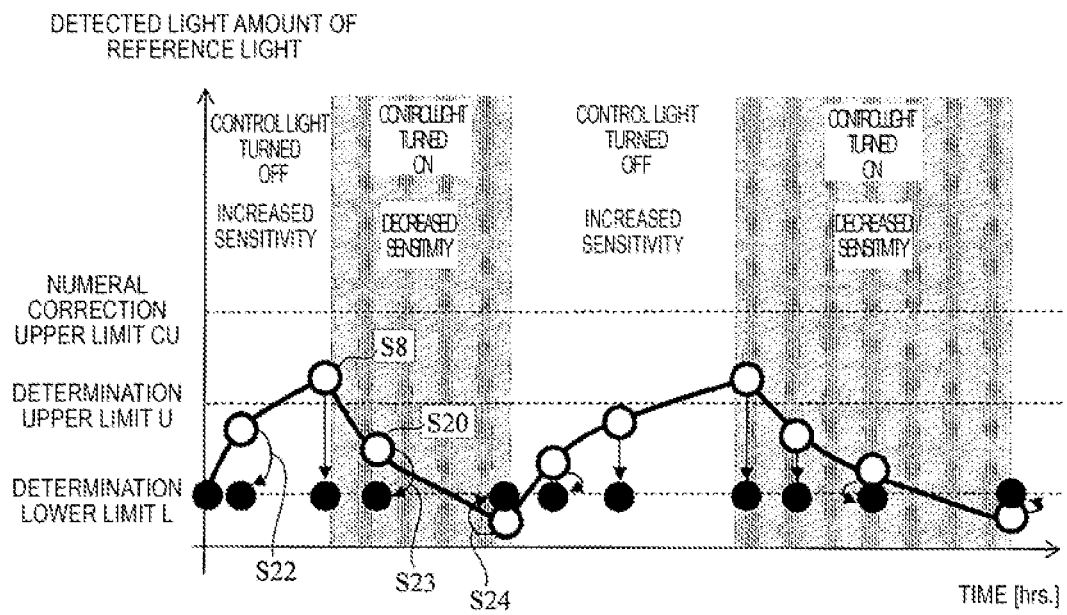
[Fig. 8]
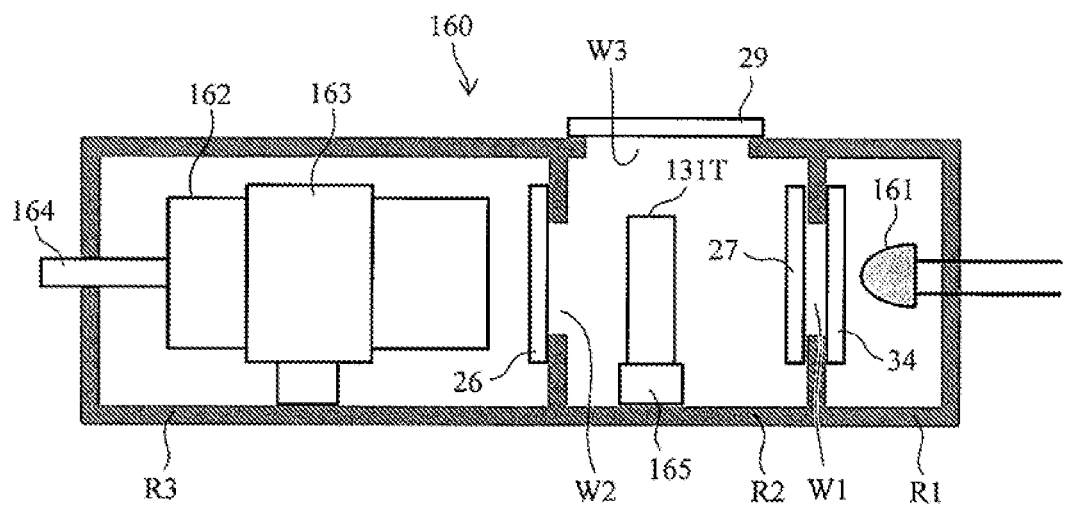

[Fig. 9]
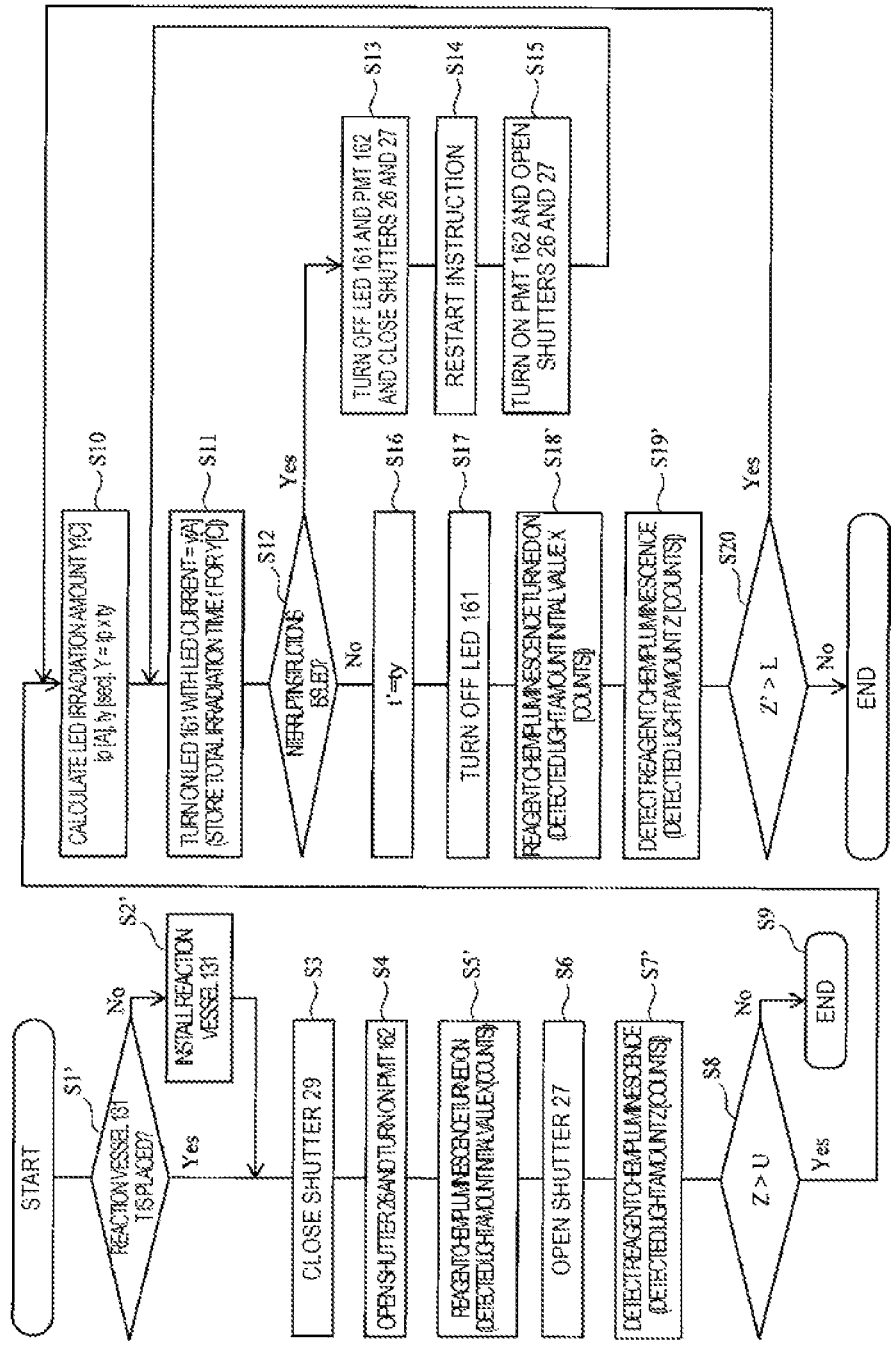

[Fig. 10]
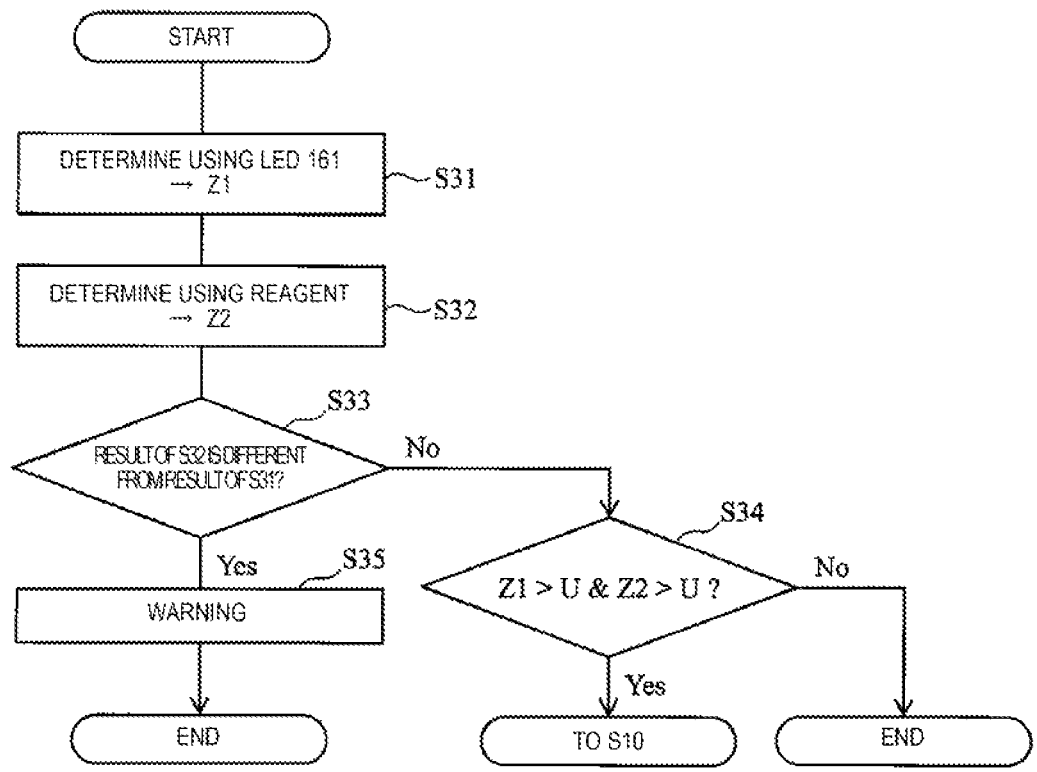
[Fig. 11]
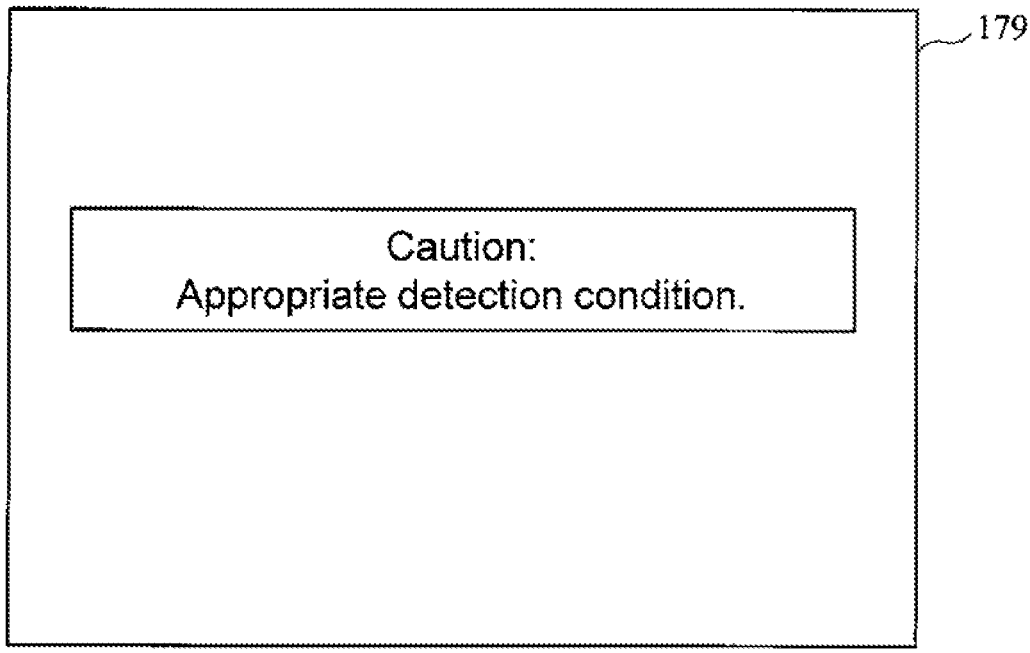

[Fig. 12]
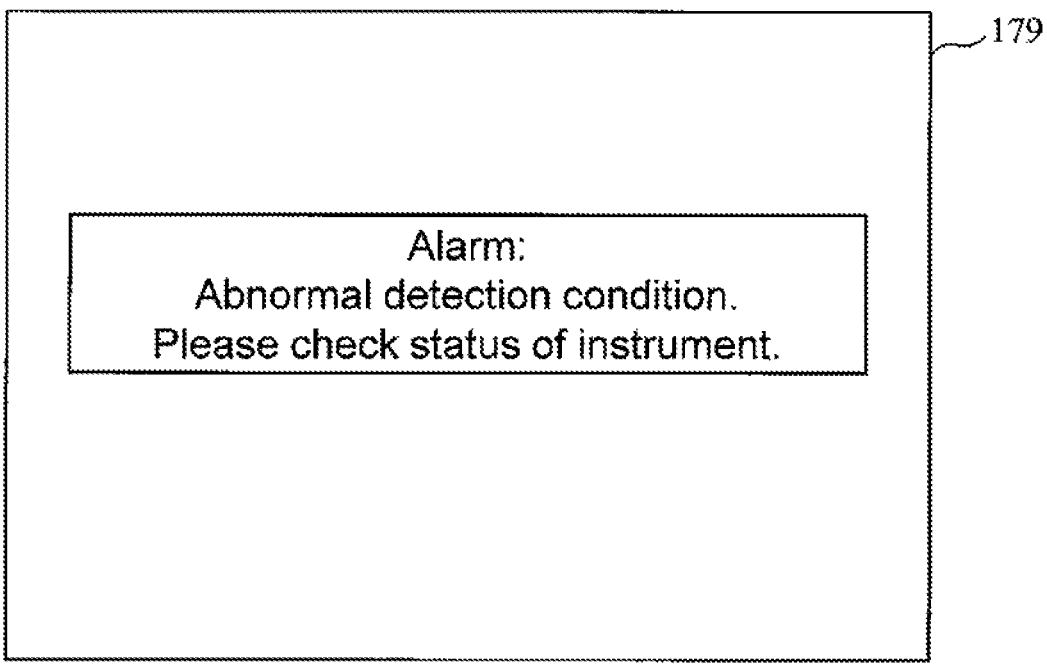

AUTOMATIC ANALYSIS APPARATUS AND METHOD FOR CONTROLLING AUTOMATIC ANALYSIS APPARATUS

TECHNICAL FIELD

The present invention relates to an automatic analysis apparatus for analyzing a sample derived from a living body, and a method for controlling the automatic analysis apparatus.

BACKGROUND ART

Quantitative measurement has been performed clinically with respect to concentration of chemical substances, such as proteins, lipids, sugars, ions, and various components constituting them, contained in body fluid components such as blood and urine. An apparatus for automating steps necessary for this measurement (for example, quantitative collection of a specimen body sample, mixing with a reagent, determination of a reaction result, measurement of a change in a substance contained in a reagent, and the like) is called an automatic analysis apparatus.

Such an automatic analysis apparatus is demanded to detect weak light emitted from a luminescent label or the like, and what is called a photomultiplier tube is used as a photodetector. The photomultiplier tube is a kind of a vacuum tube, in which a high voltage of about 700 to 1000 [V] is applied between a cathode that receives light inside the vacuum tube and converts it into electrons, and an anode from which a final signal is extracted. By utilizing this potential difference, electrons generated at the cathode of the photomultiplier tube are amplified by approximately $10^6$ times.

The sensitivity of the photomultiplier tube may increase over time due to abnormalities in the power supply and circuit during use. As an example, a case where the value of a variable resistor that determines a value of high voltage applied to the photomultiplier tube changes over time is considered. As a method of controlling the sensitivity of the photomultiplier tube, a method of adjusting a value of high voltage applied to the photomultiplier tube is known. For example, as described in Patent Document 1, there has been known a method of finally adjusting the value of high voltage utilizing that there is a certain relationship between the logarithm of the value of high voltage applied to the photomultiplier tube and the logarithm of a signal amount when the same object is measured. However, such a method of adjusting the value of high voltage has a risk of deviating from the adjustment range in a circuit for adjusting the value of high voltage.

CITATION LIST

Patent Literature

PTL 1: JP 2010-175415 A

SUMMARY OF INVENTION

Technical Problem

The present invention provides an automatic analysis apparatus capable of controlling the sensitivity of the photomultiplier tube without adjusting a high voltage value.

Solution to Problem

An automatic analysis apparatus according to the present invention includes a photomultiplier tube which detects light from a reaction vessel, a determination unit which determines an output signal of the photomultiplier tube in a case where the photomultiplier tube is irradiated with first light, and a control unit which irradiates the photomultiplier tube with second light to lower a sensitivity of the photomultiplier tube in accordance with a determination result by the determination unit.

Furthermore, a method for controlling an automatic analysis apparatus according to the present invention includes steps of irradiating the photomultiplier tube with first light, determining an output signal of the photomultiplier tube in a case where the photomultiplier tube is irradiated with the first light, and irradiating the photomultiplier tube with second light to lower a sensitivity of the photomultiplier tube in accordance with a result of the determination.

Advantageous Effects of Invention

According to the present invention, in an automatic analysis apparatus using a photomultiplier tube, an automatic analysis apparatus capable of controlling the sensitivity of the photomultiplier tube without using adjustment of a value of high voltage is provided.

BRIEF DESCRIPTION OF DRAWINGS

FIG. 1 is a schematic diagram showing an overall configuration of an automatic analysis apparatus according to a first embodiment.

FIG. 2 is a configuration diagram illustrating a configuration of a detection unit 160 of FIG. 1 in more detail.

FIG. 3 is a flowchart illustrating a procedure for inspecting a photomultiplier tube 162 in the automatic analysis apparatus according to the first embodiment, and for controlling its sensitivity as needed.

FIG. 4 is a view illustrating the principle of reducing the sensitivity of the photomultiplier tube by emitting control light.

FIG. 5 is a graph showing an exemplified relationship between increase and decrease in the sensitivity of the photomultiplier tube 162 accompanying with ON/OFF of the control light.

FIG. 6 is a flowchart showing a procedure for inspecting an output of a photomultiplier tube 162 in an automatic analysis apparatus according to a second embodiment, and for controlling its sensitivity as needed.

FIG. 7 is a conceptual diagram (graph) showing an exemplified temporal change in the sensitivity of the photomultiplier tube 162 in a case where the sensitivity of the photomultiplier tube 162 is controlled in the automatic analysis apparatus according to the second embodiment.

FIG. 8 is a schematic diagram showing an automatic analysis apparatus according to a third embodiment.

FIG. 9 is a flowchart showing a procedure for inspecting an output of a photomultiplier tube 162 in the automatic analysis apparatus according to the third embodiment, and for controlling its sensitivity as needed.

FIG. 10 is a flowchart showing a modified example according to the third embodiment.

FIG. 11 shows an exemplified display on a display 179.

FIG. 12 shows an exemplified display on the display 179.

DESCRIPTION OF EMBODIMENTS

Hereinafter, embodiments of the present invention will be described in detail with reference to the drawings. In all the drawings for describing the present embodiment, components having the same function are denoted by the same reference signs, and their repeated description is omitted as much as possible. The device structures and materials described in the embodiments are examples for embodying the idea of the present invention and do not strictly specify the materials and dimensions, but are not disclosed to limit the scope of the present invention. Furthermore, specific voltage values, current values, voltage application times, and voltage pulse time widths described in the present embodiment are also examples for embodying the idea of the present invention and do not strictly specify them, and it should be noted that they are not disclosed with an intention of limiting the scope of the embodiment.

First Embodiment

First, an automatic analysis apparatus according to a first embodiment of the present invention will be described with reference to FIG. 1 and the like.

In the first embodiment, an automatic analysis apparatus using a photomultiplier tube as a detector and a chemiluminescence method using an acridinium ester as a luminescent label in a detection unit will be described as an example, but the acridinium ester is merely an example and it is not limited to this.

FIG. 1 is a schematic diagram showing an overall configuration of the automatic analysis apparatus according to the first embodiment. The present apparatus includes a rack 111, and is structured so that a specimen vessel 112 can be mounted on the rack 111. Furthermore, the present apparatus includes a sampling mechanism 113 that sucks a specimen in the specimen vessel 112 via a sampling tip 114. The rack 111 is sequentially conveyed to a position for suction by the sampling mechanism 113 by a conveying mechanism that is not shown. The specimen sucked into the sampling tip 114 by the sampling mechanism 113 is injected into a reaction vessel 131. The reaction vessel 131 into which the specimen has been injected is transferred to a predetermined position of the reaction vessel conveyor CC having a temperature control function.

Furthermore, the present apparatus also includes reagent vessels 132 to 134, a reagent dispensing mechanism 135, a magnetic separation device 136, an acidic hydrogen peroxide solution vessel 137, a sodium hydroxide vessel 138, and solution injection mechanisms 139, 140.

The reagent dispensing mechanism 135 has a function of dispensing a reagent stored in the reagent vessels 132 to 134 to the reaction vessel 131. A predetermined amount of the specimen is dispensed into the reaction vessel 131 by the sampling mechanism 113, and the reagent and the specimen in the reaction vessel 131 can be mixed by performing a suction and discharge operation by the reagent dispensing mechanism 135. After the mixing, a reaction can be caused by holding the reaction vessel 131 on the reaction vessel conveyor CC for about nine minutes, for example. Moreover, a certain amount of a suspension of magnetic particles is dispensed from the reagent vessel 134 to the reaction vessel 131 by the reagent dispensing mechanism 135, and the reaction proceeds for about nine minutes. The reaction vessel 131 is separated into magnetic particles and supernatant by a magnetic separation device 136. Thereafter, the reaction vessel 131 is mounted in a detection unit 160 and is subjected to analysis.

As shown in FIG. 1, the detection unit 160 includes an LED 161 as a light source and a photomultiplier tube (PMT) 162 therein. The detection unit 160 includes first to third chambers R1 to R3 arranged in a row adjacent to each other. The LED 161 is arranged in the first chamber R1, the photomultiplier tube 162 is arranged in the third chamber R3, and the reaction vessel 131 to be analyzed is arranged in the intermediate second chamber R2.

Furthermore, the detection unit 160 injects an acidic hydrogen peroxide solution and a sodium hydroxide solution stored in the acidic hydrogen peroxide solution vessel 137 and the sodium hydroxide vessel 138, respectively, into the reaction vessel 131 by the solution injection mechanisms 139 and 140. Thus, chemiluminescence is generated in the reaction vessel 131. Chemiluminescence emitted from the reaction vessel 131 is received and detected by the photomultiplier tube 162 in the adjacent third chamber R3, and analysis is performed. The first to third chambers R1 to R3 are structured to be covered with a light shielding wall except for an opening connecting them one another so that light from the outside does not enter.

The present apparatus has a main controller 171, a DA converter 172, a high voltage generator 173, a logarithmic converter 174, an AD converter 175, a light emission condition conversion unit 176, a constant current source 177, a storage unit 178, and a display 179 as components for controlling the entire device including the above-described detection unit 160.

The main controller 171 controls the entire apparatus, performs calculations in accordance with obtained data, and performs data storage operations, instructions, and the like in accordance with results of the calculations. Furthermore, the main controller 171 also functions as a determination unit that makes a determination regarding an output signal of the photomultiplier tube 162. Moreover, the main controller 171 performs control to irradiate the photomultiplier tube 162 with light (control light) in a predetermined case to reduce a sensitivity thereof.

The DA converter 172 converts control data output from the main controller 171 into an analog signal and supplies the analog signal to the high voltage generator 173. The high voltage generator 173 generates voltage having a voltage value according to an applied analog signal, and supplies the generated voltage to the photomultiplier tube 162.

The logarithmic converter 174 logarithmically converts a current signal that is output according to the amount of light received by the photomultiplier tube 162, and outputs the converted signal as a voltage signal. This voltage value (analog value) is converted into a digital signal by the AD converter 175 and passed to the main controller 171.

Furthermore, the light emission condition conversion unit 176 changes a light emission condition of the LED 161 according to a control signal from the main controller 171. The constant current source 177 is configured to be capable of changing the value of a current (constant current) flowing through the LED 161 according to a light emission condition set by the light emission condition conversion unit 176.

The storage unit 178 is configured to be capable of storing a computer program that regulates operations of the main controller 171 and moreover storing an analysis result obtained by analysis and other control data. Furthermore, the display 179 can display obtained analysis results and various messages to be transmitted to the operator.

FIG. 2 is a configuration diagram illustrating the configuration of the detection unit 160 in more detail. As described above, the detection unit 160 includes three chambers, first to third chambers R1, R2, R3, connected in series in one direction. The second chamber R2 is arranged at a position between the first chamber R1 and the third chamber R3.

The first to third chambers R1 to R3 are hollow vessels formed entirely of light-shielding walls, and are configured to prevent intrusion of disturbance light and light leakage among the respective chambers R1 to R3. Light from the outside is prevented from reaching the inside. However, a light path is provided across the first to third chambers R1 to R3 so that light can be transmitted and received. That is, a window W1 as a light passage is provided between the first chamber R1 storing the LED 161 and the second chamber R2 storing the reaction vessel 131. The LED 161 is arranged such that a light emission surface of the LED 161 faces the window W1. Light from the LED 161 can reach the reaction vessel 131 via the window W1. Further, a window W2 is provided between the second chamber R2 and the third chamber R3 that stores the photomultiplier tube 162. Light emitted from the reaction vessel 131 can be received by the photomultiplier tube 162 via the window W2.

Furthermore, the second chamber R2 is provided with a window W3 for inserting or removing the reaction vessel 131.

The windows W1 to W3 are provided with shutters 26, 27, 29 for blocking the windows W1 to W3, respectively. The shutters 26, 27 open the windows W1 and W2 when the photomultiplier tube 162 is inspected so that light of the LED 161 reaches the photomultiplier tube 162. Furthermore, the shutter 29 is opened when the reaction vessel 131 is loaded in or evacuated from the second chamber R2, or when a solution is injected into the reaction vessel 131 by the solution injection mechanisms 139, 140, and is closed when an inspection or the like is started. Each of the shutters 26, 27, 29 is connected to a stepping motor (not shown) and opens and closes independently according to a control signal from the main controller 171.

Furthermore, a Neutral Density (ND) filter 34 is arranged on the window W1 in addition to the shutter 27. The ND filter 34 is connected to the main controller 171, and light transmittance of the ND filter 34 can be arbitrarily changed. This makes it possible to adjust the amount of light emitted from the LED 161 so as to prevent damage due to excessive light entering the photomultiplier tube 162.

In the third chamber R3, the photomultiplier tube 162 is fixed inside the third chamber R3 via the photomultiplier tube holder 163. Moreover, the photomultiplier tube 162 is arranged so that its light receiving surface faces the window W2. A cable 164 is connected to the photomultiplier tube 162, and the cable 164 is led out of the third chamber R3. Then, the photomultiplier tube 162 is connected to the high voltage generator 173 and the logarithmic converter 174 described above via the cable 164. Moreover, a constant voltage power supply (not shown) is connected to the high voltage generator 173. Note that a seal (not shown) is provided between the cable 164 and the third chamber R3 so as to prevent intrusion of disturbance light. Furthermore, the second chamber R2 is provided with a reaction vessel holder 165 for detachably holding the reaction vessel 131. Note that the reaction vessel holder 165 can include a reaction vessel sensor (not shown) for detecting presence or absence of the reaction vessel 131. The shape and structure of the reaction vessel holder 165 are determined based on the reaction vessel 131 used for the immunoassay. Then, as the reaction vessel 131, various general ones such as a test tube, a square cell, a slide plate, a microplate, and a flow cell can be used.

Note that terminals of the LED 161 are led out of the first chamber R1, and are held by a wall surface of the first chamber R1. The LED 161 is connected to an external power supply (not shown) via the aforementioned constant current source 177, and the amount of light emitted from the LED 161 is adjusted by the constant current source 177. Note that a seal (not shown) is provided also between the terminals of the LED 161 and the first chamber R1 to prevent intrusion of disturbance light. Various general LEDs can be used as the LED 161. As the LED 161, one that has at least an emission wavelength that is close to the emission wavelength of a luminescent substance to be subjected to a luminescence reaction with the sample in the reaction vessel 131 is preferable, but it may be configured such that the wavelength is selected by a filter (not shown) different from the LED 161. Furthermore, if optical conditions of the emission wavelength of the luminescent substance and a luminescent component of the LED 161 are arranged in association with each other in advance, it is not necessary to replace the LED 161 for every measurement item, luminescent substance, and the like.

The reaction vessel 131 is transferred to the second chamber R2 by a reaction vessel transfer unit (not shown), and is mounted on the reaction vessel holder 165. When the reaction vessel 131 is carried out, the reaction vessel 131 is transferred to the outside of the second chamber R2 similarly by the reaction vessel transfer unit. Here, a general cell loader, a transfer arm, or the like can be used as the reaction vessel transfer unit.

Note that although not shown, in the second chamber R2, an injection unit may be incorporated that is configured to inject a substrate solution or the like for causing a luminescence reaction into the reaction vessel 131 held in the reaction vessel holder 165 at an appropriate timing.

Next, a procedure (control method) for inspecting the photomultiplier tube 162 in the automatic analysis apparatus having the above configuration and controlling the sensitivity as necessary will be described with reference to the flowchart of FIG. 3.

First, the photomultiplier tube 162 is inspected according to steps S1 to S9 of the flowchart of FIG. 3. Specifically, the photomultiplier tube 162 is irradiated with reference light (first light) from the LED 161, and it is determined whether the sensitivity of the photomultiplier tube 162 has increased to exceed a reference value (determination upper limit value) from an output signal of the photomultiplier tube 162. If it exceeds the reference value, a procedure for controlling the sensitivity of the photomultiplier tube 162 to an appropriate range is executed according to steps S10 to S21. Specifically, by irradiating the photomultiplier tube 162 with control light (second light) from the LED 161 for a certain period of time, the sensitivity of the photomultiplier tube 162 is reduced, and in a stage that an appropriate value (value equal to or less than a determination lower limit) is obtained, the irradiation with the control light is stopped. By employing such a method, the sensitivity of the photomultiplier tube 162 can be adjusted in an appropriate range without being restricted by an adjustment range derived from a drive circuit or dark current (without using adjustment of the high voltage value).

Each procedure of this flowchart will be described in order of execution.

First, in step S1, the main controller 171 detects that the reaction vessel 131 is not installed on the reaction vessel holder 165 of the second chamber R2 based on an output of the reaction vessel sensor (not illustrated) (step S1). If it is installed, the reaction vessel 131 is evacuated from the second chamber R2 using a reaction vessel conveying mechanism (not illustrated) (step S2).

When evacuation of the reaction vessel 131 is completed, the main controller 171 closes the shutter 29 (step S3). Then, the shutter 26 is opened, and a predetermined high voltage is applied to the photomultiplier tube 162 so that the photomultiplier tube 162 is operable (step S4).

The light emission condition conversion unit 176 sets a current value for emitting the reference light from the LED 161, and the LED 161 is turned on (step S5). Here, the reference light is light having a constant intensity that serves as a reference for evaluating sensitivity fluctuation of the photomultiplier tube 162. The intensity of the reference light is obtained by setting a predetermined LED current according to the light emission condition determined by the light emission condition conversion unit 176. In order to set the amount of current of the LED 161, providing the constant current source 177 with a dip switch structured to be switchable among a plurality of resistance values, or the like is conceivable. In the present embodiment, the current value for emitting the reference light is x [A]. x is, for example, a value of about 0.1 [mA] to about 100 [mA]. Here, it is assumed that x=3 [mA] as an example.

In the automatic analysis apparatus according to the first embodiment, the photomultiplier tube 162 detects the reference light. The current flowing through the photomultiplier tube 162, that is, a detected current is integrated over a predetermined period of time (for example, 0.4 [s] to 1.0 [s]) by detection, and an amount proportional to the integrated value is determined as a detected light amount in the photomultiplier tube 162. The dimension of the detected light amount corresponds to the number of photons. Hereinafter, the unit of the detected light amount is "count".

An initial value of the detected light amount of the reference light is X [count]. In the present embodiment, for example, X=100,000 [counts]. The initial value means the value of the detected light amount at a certain point that is arbitrarily determined. For example, the light amount of the reference light can be measured immediately after manufacturing the apparatus, immediately after newly attaching the photomultiplier tube 162, or at other timing. The main controller 171 stores an initial value X of the detected light amount of the reference light in the storage unit 178 or the like.

When light emission of the LED 161 is started in step S5, the main controller 171 opens the shutter 27 and guides the reference light emitted from the LED 161 to the photomultiplier tube 162 (step S6). Then, the reference light from the LED 161 is detected by the photomultiplier tube 162, and a detected light amount Z [count] is obtained (step S7).

The main controller 171 compares this detected light amount Z [count] with a predetermined reference value for increase in the sensitivity of the photomultiplier tube 162, that is, a determination upper limit value (U [count]), and determines whether or not Z>U (step S8). The determination upper limit value U can be set to a value obtained by multiplying the initial value X described above by a constant. As an example, the determination upper limit value U can be set to 103,000 [counts], which is 3% larger than the initial value X.

When the detected light amount (Z [count]) of the reference light is equal to or smaller than the determination upper limit value U (Z≤U), for example, when it is 101,500 [counts], the sensitivity increase of the photomultiplier tube 162 is not zero but is considered allowable or within the range of experimental error, and this flow is ended (step S9) without performing an operation of reducing the sensitivity of the photomultiplier tube 162 (step S10 and thereafter).

On the other hand, when the detected light amount of the reference light (Z [count]) is larger than the determination upper limit value U (Z>U), for example, when Z=104,000 [counts], the procedure from step S10 is executed so as to reduce the increased the sensitivity of the photomultiplier tube 162.

Here, the principle of reducing the sensitivity of the photomultiplier tube by irradiation with the control light will be described with reference to FIG. 4. At this time, an anode current of the photomultiplier tube is 70 [uA]. FIG. 4 is a diagram illustrating an example of a typical relationship between light irradiation time and the sensitivity in the photomultiplier tube. As illustrated in FIG. 4, the sensitivity of the photomultiplier tube generally decreases as the total light irradiation time increases, although there are individual differences. In general, this is also referred to as life characteristics.

In the present embodiment, the sensitivity of the photomultiplier tube 162 is reduced by performing light irradiation by utilizing such a property of the photomultiplier tube. The amount of reduction in the sensitivity is a function of the output current (anode current) of the photomultiplier tube and varies depending on the type of photomultiplier tube.

In the example of FIG. 4, the rate of decrease in the sensitivity of the photomultiplier tube due to light irradiation for one hour from the initial state is −2 [%/hrs.]. Since the anode current of the photomultiplier tube at this time is 70 [uA], the sensitivity reduction rate can also be expressed as −7.9 [%/C] from the relationship between the time and the unit of current. That is, a desired reduction in the sensitivity is achieved by determining the intensity of the control light from the LED 161 so that the output (anode) current amount of the photomultiplier tube is constant with respect to a predetermined incident light, and performing irradiation for a certain period of time.

When it is determined that Z>U in step S8, the process proceeds to step S10, and an operation for reducing the increased sensitivity of the photomultiplier tube 162 is started.

First, in step S10, the main controller 171 determines a target light amount of the control light from the LED 161 according to the detected light amount Z of the reference light (step S10). The target light amount of the control light can be defined as a target charge amount Y [C] (=Ip×ty) when the output current (anode current) Ip [A] of the photomultiplier tube 162 is integrated with a target irradiation time ty [s]. For example, when it is desired to reduce the sensitivity of the photomultiplier tube 162 having the characteristics as in FIG. 4 by 4%, it is sufficient if the photomultiplier tube 162 is irradiated with control light that causes the anode current of the photomultiplier tube 162 to be 70 [uA] for 7200 [s], that is, 2 hours. Thus, the target charge amount Y becomes 0.504 [C]. That is, by irradiating the photomultiplier tube 162 with control light with a target light amount corresponding to the target charge amount of 0.504 [C], the target reduction of sensitivity can be reduced.

In order to set the anode current of the LED 161 to a predetermined value, a current value y [A] applied to the LED 161, transmittance of the ND filter 34, a distance between the LED 161 and the photomultiplier tube 162, and the like may be appropriately set. The current value applied to the LED 161 is adjustable by the light emission condition conversion unit 176. Transmittance of the ND filter 34 can be adjusted by the main controller 171. In the present embodiment, it is assumed that the current value y applied to the LED 161 is set to 30 [mA], transmittance T of the ND filter is set to 1%, and an anode current value of about 70 [uA] is obtained. Note that it is assumed that the detected light amount corresponding to the anode current value is approximately 1 million [counts].

The main controller 171 sets the target irradiation time so that the target light amount of the control light is determined. The light emission condition conversion unit 176 sets the current value y [A] for emitting the control light from the LED 161, and the LED 161 is turned on for a time determined by the main controller 171 (step S11). At this time, the main controller 171 appropriately stores the total time t' [sec] of irradiation with the control light up to the present toward the set target charge amount Y [C].

Irradiation with the control light may be performed at any timing other than the timing at which an analysis of the reaction vessel 131 is performed. For example, it is possible to utilize a start-up operation time of the apparatus, an end operation time of the apparatus, and moreover a time in which a preparation operation (for example, reagent dispensing or reagent incubation) for chemiluminescence analysis is performed.

In the example of FIG. 3, during sensitivity control of the photomultiplier tube 162 by irradiation with the control light, the irradiation with the control light can be stopped by an instruction from the user (interruption instruction (step S12)). For example, it is stopped when there is an instruction to shut down the automatic analysis apparatus or to turn off the power, or when the specimen vessel is introduced into the present automatic analysis apparatus and an instruction to perform chemiluminescence analysis is issued, or the like. At this time, the main controller 171 turns off the LED 161 to interrupt irradiation with the control light, stops applying the high voltage to the photomultiplier tube 162 to turn off the photomultiplier tube 162, and closes the shutters 26 and 27 so as to avoid unnecessary incidence of external light on the photomultiplier tube 162 (step S13).

Thereafter, the main controller 171 waits for an instruction to resume irradiation with the control light. When a state in which the control light cannot be irradiated is canceled, that is, when power of the apparatus is turned on again and a start-up operation of the apparatus begins, or when a preparation operation for chemiluminescence analysis (for example, reagent dispensing or reagent incubation) begins, a restart instruction is issued to the main controller 171 (step S14). Thereafter, the main controller 171 resumes application of high voltage to the photomultiplier tube 162, and opens the shutters 26, 27 (step S15). Then, again, the main controller 171 adjusts light of the LED 161 so as to have a predetermined amount of control light, the light emission condition conversion unit 176 sets the current value for emitting the control light from the LED 161, and the LED 161 is turned on (step S11).

When the total time t' [sec] of irradiation with the control light for reducing the sensitivity of the photomultiplier tube 162 reaches the target value ty [sec](step S16), the main controller 171 stops the irradiation with the control light from the LED 161 (step S17). Thereafter, the main controller 171 executes the above-described irradiation with the reference light again to check the sensitivity of the photomultiplier tube 162. That is, similarly to step S5, the light emission condition conversion unit 176 sets the current value for emitting the reference light from the LED 161, and the LED 161 is turned on (step S18).

Next, the main controller 171 obtains the detected light amount of the photomultiplier tube 162 when the reference light is emitted from the LED 161 (step S19). The value of this detected light amount is defined as Z' [count] by the number of photons. The main controller 171 compares this detected light amount Z' and a determination lower limit value (L [count]) that is a reference value (target value) for reduction of the sensitivity of the photomultiplier tube 162 (step S20). In the illustrated example, for example, L=X=100,000 [counts]. That is, the above-described initial value X is set to the determination lower limit value L.

When the detected light amount Z' [count] of the reference light is equal to or smaller than the determination lower limit value L (Z' S L), for example, when Z'=99,000 [counts], the sensitivity of the photomultiplier tube 162 falls below the initial value but is considered to have returned to the allowable range of experimental error, and this flow is ended (step S21).

On the other hand, when the detected light amount (Z' [count]) of the reference light is larger than the determination lower limit value L, for example, when Z'=102,000 [counts], the flow returns to step S10, a necessary amount of the control light is determined again, and irradiation with the control light is performed, so as to reduce the increased sensitivity of the photomultiplier tube 162. When Z'=102,000 counts and L=100,000 counts, it is determined that the sensitivity needs to be further reduced by 2%, and the amount of the control light and the total irradiation time are determined.

As described above, in the above-described embodiment, after irradiation with a certain amount of the control light is completed, the sensitivity of the photomultiplier tube 162 is checked again with the reference light, and when the sensitivity is not reduced to the target value, the irradiation with the control light is performed again. Such an operation is preferable because the sensitivity can be returned to an appropriate range even in the case described below. That is, it is known that the reduction rate of the sensitivity of the photomultiplier tube 162 with respect to light irradiation not only varies from individual to individual but also varies according to the amount of light irradiation even within the same individual piece. In addition, even while irradiation with the control light is performed, the sensitivity may conversely increase due to some other factor. Therefore, there may be cases where the sensitivity is not reduced as expected by irradiation with the control light of an assumed irradiation amount.

FIG. 5 is a graph showing an example of a relationship between increase and decrease in the sensitivity of the photomultiplier tube 162 along with turning on and off of the control light. Black circle dots in the graph indicate the detected light amount of the photomultiplier tube 162 when irradiated with the reference light. During a period in which the control light is not irradiated (control light off), the sensitivity of the photomultiplier tube 162 tends to increase, and the sensitivity may exceed the determination upper limit value U. When the sensitivity of the photomultiplier tube 162 exceeds the determination upper limit value U, irradiation with the control light is started (on) as described in step S8 of FIG. 3, and during an irradiation period thereof, the sensitivity of the photomultiplier tube 162 gradually decreases. Also during this irradiation period, after irradiated with a predetermined amount of the control light, the sensitivity of the photomultiplier tube 162 is checked using the reference light (step S20). When an output signal of the photomultiplier tube 162 becomes equal to or lower than the determination lower limit value L, the irradiation with the control light ends, or when the output signal is larger than the determination lower limit value L, the irradiation with the control light is continued.

Note that in the above-described first embodiment, the apparatus that uses the chemiluminescence method using acridinium ester as a luminescent label in the detection unit has been described as an example, but the acridinium ester is merely an example. Other publicly known method, for example, chemiluminescent enzyme immunoassay using luminol, electrochemiluminescence method using ruthenium complex, or bioluminescent enzyme immunoassay using luciferin may be used, and these methods may also be included within the scope of the present invention.

Here, in the first embodiment, as illustrated in FIG. 3, the amount of the control light is set so that the sensitivity of the photomultiplier tube 162 is controlled to be equal to or less than the determination lower limit value U by irradiation with the control light. As described above, by performing control to maintain the sensitivity of the photomultiplier tube 162 in a proximity of the determination lower limit value U, the sensitivity (absolute value) of the photomultiplier tube 162 is maintained equal to an initial value. Thus, the automatic analysis apparatus can be used while maintaining the relationship between a signal amount and concentration, that is, precision of a calibration curve, which is originally held as a data table inside the apparatus by the automatic analysis apparatus. That is, concentration of a substance to be analyzed in a sample can be correctly calculated based on an output signal of the photomultiplier tube 162. In this sense, control of the sensitivity of the photomultiplier tube 162 by irradiation with the control light in the first embodiment is different from the technique of performing preliminary light irradiation before measurement so as to keep the sensitivity of a light receiving sensor constant by aging effect of a light receiving surface, and reduce a warm-up time of the measurement. Specifically, it is different in that whether or not to perform control light irradiation on the photomultiplier tube is appropriately determined according to a detected light amount of the photomultiplier tube when irradiated with the reference light. In this manner, it is possible to control the sensitivity of the photomultiplier tube within a certain range determined based on a reference value, and maintain quantitativeness of the measurement system. Furthermore, similarly, control of the sensitivity of the photomultiplier tube 162 by light irradiation with the control light in the first embodiment is different from a technique of performing a continuous operation for several hours to several tens of hours before use, to thereby reduce the "amount of change" of an output of the photomultiplier tube. Specifically, the present invention is different in that the sensitivity of the photomultiplier tube is controlled within a certain range determined based on a reference value. In this manner, it is possible to maintain quantitativeness of the measurement system.

The relationship between the reference light emitted in step S5 and the light amount of the control light irradiated in step S10 will be described below. In this embodiment, as an example, the output (anode) current of the photomultiplier tube 162 when irradiated with the reference light can be 1 [uA], while the output (anode) current of the photomultiplier tube 162 when irradiated with the control light can be 50 [uA]. As described above, by making the output current and thus the light emission amount of the LED 161 different by the reference light (first light) and the control light (second light), the light amount according to each purpose can be selected. For example, the light amount of the reference light may be an average value used in typical analysis of a blood sample, while the light amount of the control light can be a larger value in order to promote a decrease in sensitivity. Particularly in a region where the detected light amount is high, there may be cases where the relationship between the light amount and the sensitivity is not linear. Even in such a region, there is no problem in promoting sensitivity reduction, but when used as a reference light, it is difficult to appropriately detect a change in the sensitivity. Such a problem can be avoided by separating the first light amount and the second light amount.

It is desirable that the amount of the control light per unit time (output current or anode current) be 10 times or more the amount of the reference light per unit time (output current or anode current). As in the above example, when the output current of the LED 161 at a time of emission of the control light is 50 µA and the output current of the LED 161 at the time of emission of the reference light is 1 µA, the light amount per unit time of the control light is 50 times the amount of light per unit time of the reference light. In this manner, it is possible to achieve both stability of the reference light and promotion of sensitivity reduction by the control light.

Note that in the first embodiment, both the reference light and the control light are generated by one LED 161, and the LED 161 serves as both a light source for the reference light and a light source for the control light. Thus, the number of light sources and the number of control circuit elements can be saved, and the space can be saved. However, a modification example in which a light source for emitting the reference light and a light source for emitting the control light are provided separately are possible, and such a modification example is also included in the scope of the present invention. By separately providing the light sources for the reference light and the control light, it is easy to adjust the amount of light emitted from each light source. For example, the LED that emits the reference light may be an LED having a rated current of about 3 [mA], while the LED that emits the control light may be a high-output LED whose rated current is about 30 [mA]. As a result, instability of output due to the current value deviating from the rating and a risk of temperature rise of the elements can be reduced.

However, even if one LED 161 is used for both the reference light and the control light as in the first embodiment, if the output current can be kept constant, the light amount of emitted light has an amount of variation to such an extent that does not pose a practical problem and is negligible.

Second Embodiment

Next, an automatic analysis apparatus according to a second embodiment will be described with reference to FIGS. 6 and 7. An external appearance of a configuration of the apparatus is identical to that of the first embodiment (FIG. 1), and thus duplicate descriptions will be omitted. However, the second embodiment is different from the first embodiment in an operation of controlling the sensitivity of the photomultiplier tube 162. Specifically, the second embodiment is different from the first embodiment in that, control of the sensitivity of the photomultiplier tube 162 by correcting an electric signal is also performed in addition to control of sensitivity of the photomultiplier tube 162 by irradiation with the control light.

FIG. 6 is a flowchart showing a procedure for inspecting the photomultiplier tube 162 and controlling its sensitivity as necessary in the automatic analysis apparatus according to the second embodiment. Furthermore, FIG. 7 is a conceptual diagram (graph) showing an example of a temporal change in the sensitivity of the photomultiplier tube 162 when the control is performed. In FIG. 6, procedures that are the same as that of the first embodiment (FIG. 3) is given the same reference signs (S1, S2, S3 . . . ). Thus, duplicate descriptions will be omitted below, and only differences will be described. Furthermore, white circle dots in the graph of FIG. 7 indicate the detected light amount of the photomultiplier tube 162 when irradiated with the reference light, and black circle dots indicate the detected light amount of the photomultiplier tube 162 after correction of an electric signal.

A procedure for controlling the sensitivity of the photomultiplier tube 162 in the automatic analysis apparatus according to the second embodiment is substantially the same in S1 to S9 as that in the first embodiment. However, if it is determined in step S8 that Z≤UL (No), the electric signal is corrected so that the detected light amount of the photomultiplier tube 162 approaches the determination lower limit value L in accordance with the value of Z before ending this flow (step S22).

A procedure for irradiating the photomultiplier tube 162 with control light is also substantially the same in S10 to S19. However, in the second embodiment, when it is determined in step S20 that a detected light amount Z' of the photomultiplier tube 162 is larger than the determination lower limit value L (Z'>L), in addition to (or instead of) performing irradiation with the control light again, the obtained detected light amount Z' is corrected as an electric signal (step S23). Consequently, the sensitivity of the photomultiplier tube 162 is electrically corrected so as to have the sensitivity corresponding to the determination lower limit value L. When such a correction is made, the automatic analysis apparatus can be used while maintaining the relationship between a signal amount and concentration, that is, the precision of the calibration curve (master curve) which the automatic analysis apparatus holds internally, in a higher state. Note that if it is determined in step S20 that Z' S L, that is, if it is determined that the sensitivity of the photomultiplier tube 162 has fallen below the determination lower limit value, a correction to conversely increase the sensitivity is performed (step S24), and thereafter this flow is ended.

This operation will be described with reference to FIG. 7. FIG. 7 is a schematic diagram showing a relationship between an increase and a decrease of the sensitivity of the photomultiplier tube 162 along with on and off of the control light, and an electrical correction inside the apparatus. In FIG. 7, white circle dots indicate the detected light amount of the photomultiplier tube 162 when irradiated with the reference light.

Furthermore, black circle dots are values obtained by correcting the electric signal based on this detected light amount so that the detected light amount becomes equal to the initial value, that is, the detected light amount after correction. By obtaining a correction value that leads to the initial value in this manner, the automatic analysis apparatus can be used while maintaining the precision of the calibration curve (master curve), and correctly calculate concentration of a substance to be analyzed in the sample in the reaction vessel 131.

Note that the numerical (electric signal) correction in steps S22, S23, S24 is such that when the detected light amount of the photomultiplier tube 162 exceeds a numerical correction upper limit value CU (>U) that is even larger than the determination upper limit value U, the signal may be saturated and it may be difficult to correct the signal after the saturation. For this reason, although illustrations in FIGS. 6 and 7 are omitted, when the detected light amount Z of the photomultiplier tube 162 exceeds the numerical correction upper limit value CU, it is preferable to execute only the operation of reducing the sensitivity with the control light similarly to the first embodiment, without performing the correction in step S22.

Third Embodiment

Next, an automatic analysis apparatus according to a third embodiment will be described with reference to FIG. 8. An external appearance of a configuration of the apparatus is identical to that of the first embodiment (FIG. 1), and thus duplicate descriptions will be omitted. However, the third embodiment differs from the first embodiment in the operation of controlling the sensitivity of the photomultiplier tube 162. Specifically, the third embodiment is configured to use light from a predetermined reagent as reference light for determining the sensitivity of the photomultiplier tube 162, and this point is different from the first embodiment in which the LED 161 emits reference light. Specifically, in the third embodiment, as shown in FIG. 8, the reagent that emits reference light is injected into a reaction vessel 131T, and this reaction vessel 131T is mounted in the second chamber R2 to increase photoelectron intensity, so as to allow emission of the reference light to the photomultiplier tube 162. Note that the control light is emitted from the LED 161 as in the first embodiment.

FIG. 9 is a flowchart showing a procedure for inspecting the photomultiplier tube 162 and controlling the sensitivity thereof as necessary in the automatic analysis apparatus according to the third embodiment. Steps that are the same as those in the first embodiment are given the same reference signs as in FIG. 3, and duplicate descriptions will be omitted below.

One of differences from FIG. 3 is that in step S1' the main controller 171 confirms whether or not the reaction vessel 131T containing the reagent for emitting reference light is installed on reaction vessel holder 165 by an arbitrary sensor (not shown). If it is not installed, the reaction vessel 131T is installed on the reaction vessel holder 165 (step S2'). When installation of the reaction vessel 131T' is confirmed, the process proceeds to the next step (step S3). In steps S5', S6, S7', light from the reagent contained in the reaction vessel 131T is radiated toward the photomultiplier tube 162 instead of light emission from the LED 161. Furthermore, the detected light amount after the irradiation with the control light is similarly checked using the light from the reagent in the reaction vessel 131T (steps S18', S19'). Note that in addition to the reference light from the reagent in the reaction vessel 131T, it is also possible to radiate the reference light of the LED 161 together to the photomultiplier tube 162.

As the reagent for emitting the reference light stored in the reaction vessel 131T, it is desirable to use what is called a standard sample or a precision control sample, which is a calibration sample prepared in advance using a weight or volume outside the automatic analysis apparatus. The standard sample and the precision control sample are prepared for the analysis target, such as blood thyroid stimulating hormone, to be actually measured by the system, and are samples routinely used by a user for the purpose of clinical testing. The relationship between a signal amount and concentration is generally set for the standard sample and the precision control sample. Generally, in the case of a standard sample, a supplier who provides a clinical test agent provides the sample integrally with the clinical test agent. Particularly, in a highly sensitive immunoassay method that is highly sensitive in which there are differences among lots of reagents, the supplier who provides a clinical test agent to the system provides them. Therefore, when providing standard solutions, for example, of two points, a low-concentration side and a high-concentration side in the manufacturing stage, it is necessary to know in advance how much signal each standard sample produces. Furthermore, the precision control sample is a sample in which an allowable concentration is indicated in advance, and if the apparatus is calibrated with an appropriate standard sample, the signal amount to be output can be predicted. As described above, according to the third embodiment, information regarding the sensitivity of the photomultiplier tube can be obtained from an analysis result of the calibration sample that is regularly used by a user of the automatic analysis apparatus. Furthermore, by using a measurement result of the sample used for calibration of the calibration curve as it is, information can be obtained without using an additional reagent, which is economically efficient.

Here, although light from a predetermined reagent is used as the reference light in the above-described embodiment, in addition to determination of the sensitivity of the photomultiplier tube using light from this reagent, it is also possible to perform together determination of the sensitivity of the photomultiplier tube by emitting the reference light from the LED 161.

For example, as shown in FIG. 10, after performing determination of the sensitivity of the photomultiplier tube 162 using the reference light from the LED 161 to obtain a detected light amount Z1 (step S31), determination of the sensitivity of the photomultiplier tube 162 using the reference light from the reagent stored in the reaction vessel 131T is performed to obtain a detected light amount Z2 (step S32). Thereafter, the detected light amount Z1 obtained in step S31 and the detected light amount Z2 obtained in step S32 are each compared with the determination upper limit value U to determine whether or not the two determination results are different (step S33).

If the two determination results match (the determination result exceeds (or does not exceed) the determination upper limit value in either determination), the process proceeds to step S34, and whether or not both Z1, Z2 are larger than the determination upper limit value U is determined. If both Z1, Z2 are equal to or smaller than the determination upper limit value U, this flow is ended. On the other hand, if both Z1, Z2 are larger than the determination upper limit value U, the process proceeds to step S10 in FIG. 9 to control the sensitivity of the photomultiplier tube 162 by irradiation with the control light as in the above-described embodiment.

On the other hand, if the two comparison results of S31 and S32 are different, warning information is output via the display 179 or the like (step S35). For example, even though no large fluctuation is recognized in the reference light from the LED 161, if the detected light amount measured using the reference light from the reagent in the reaction vessel 131T outputs some kind of abnormal value, it is possible to suspect an abnormality in the reaction vessel 131, the reagent, or the mixing process of the reagent instead of a fluctuation of the sensitivity of the photomultiplier tube 162. In this case, information regarding the abnormality may be displayed on the display 179 or other display unit of the automatic analysis apparatus.

OTHER

A control light irradiation step can be started at an arbitrary timing when the light emission amount of the reaction vessel 131 is not measured. In particular, the control light irradiation step is preferably performed, for example, when a warm-up operation is performed after starting the automatic analysis apparatus, when a termination processing operation is performed after an instruction to shut down the automatic analysis apparatus is given, or in a standby state waiting for that a specimen vessel to be analyzed is placed in the apparatus. Thus, a certain time difference can be given between the step of measuring the light emission amount of the reaction vessel 131 and the control light irradiation step.

By giving a time difference, particularly in a sensitive photomultiplier tube, after irradiating with the control light that may have a relatively large anode current amount, the photoelectric surface of the photomultiplier tube is temporarily activated, and it is possible to prevent measurement of the light emission amount of chemiluminescence from being affected.

Furthermore, when the sensitivity of the photomultiplier tube is controlled as described above, it is desirable to display information regarding the sensitivity control on the display 179 or other display unit of the automatic analysis apparatus. The information regarding the sensitivity control is, for example, (1) the sensitivity of the photomultiplier tube 162 has been confirmed to be within an appropriate range, (2) abnormality has been detected while controlling the sensitivity of the photomultiplier tube 162, (3) the upper limit value appropriately set according to control of the sensitivity of the photomultiplier tube 162 has been exceeded, or the like.

Note that an example of "(2) abnormality has been detected while controlling the sensitivity of the photomultiplier tube 162" is a case where a fluctuation larger than normally expected is detected, such as detection of an abnormal value, for example, a detected light amount equal to or more than three times the initial value, at a point that the detected light amount of the photomultiplier tube 162 when irradiated with the reference light is checked. Alternatively, another example is a case where, when a plurality of measurements is performed to improve precision of a detected light amount of the photomultiplier tube 162, there is detected a larger fluctuation than normally expected, such as a value whose standard deviation is abnormal, for example, a value whose ratio to the average value of the detected light amount exceeds 10%. As another example, there is a case where the detected light amount is significantly increased after the irradiation with the control light. In such a case, it is determined that it is difficult to optimize the sensitivity only by irradiating the control light or by numerical correction, and it is possible to prompt the user to perform maintenance by an apparatus maintenance staff or appropriate component replacement.

Furthermore, an example of "(3) the upper limit value appropriately set according to control of the sensitivity of the photomultiplier tube 162 has been exceeded" is a case where a total detected light amount (total value of detected light amounts) over the entire period after the photomultiplier tube 162 is installed on the automatic analysis apparatus exceeds a predetermined upper limit value. The automatic analysis apparatus according to this embodiment suppresses the sensitivity of the photomultiplier tube 162 by the control light and optimizes the sensitivity. Therefore, the fact that the total detected light amount exceeds a certain upper limit value means that an increase in the sensitivity of the photomultiplier tube 162 occurs continuously. It is desirable that such an automatic analysis apparatus receive maintenance by a person in charge of machine maintenance to check the condition of the apparatus and to replace parts as appropriate, at the stage that the total detected light amount exceeds a certain upper limit value, from the viewpoint of preventing troubles in the future in terms of preventive maintenance.

FIG. 11 is an example of a display screen of the display 179 after sensitivity control processing in the automatic analysis apparatus according to the embodiment. In this example, information (Appropriate detection condition.) indicating that the condition of the detection unit is appropriate is displayed. Thus, the user of the automatic analysis apparatus according to the present embodiment can perform an analysis work after recognizing that the condition of the detection unit is appropriate.

FIG. 12 is another example of the display screen of the display 179 after the sensitivity control processing of the photomultiplier tube 162 in the automatic analysis apparatus according to the present embodiment. This example is of a display that informs the user that an abnormality has been detected in the detection unit during control of the sensitivity of the photomultiplier tube 162 and that maintenance of the automatic analysis apparatus is to be performed (Abnormal detection condition. Please check status of instrument.). Thus, the user of the apparatus can recognize that an abnormality has occurred in the detection unit of the automatic analysis apparatus and that it is necessary to check the condition.

While some embodiments of the present invention have been described above, these embodiments have been presented by way of example only, and are not intended to limit the scope of the invention. These novel embodiments can be implemented in other various forms, and various omissions, replacements, and changes can be made without departing from the gist of the invention. These embodiments and their modifications are included in the scope and gist of the invention, and are also included in the invention described in the claims and their equivalent scope.

REFERENCE SIGNS LIST 26, 27, 29 shutter
111 rack
112 specimen vessel
113 sampling mechanism
114 sampling tip
131 reaction vessel
131T reaction vessel
CC reaction vessel conveyor
132 to 134 reagent vessel
135 reagent dispensing mechanism
136 magnetic separation device
137 acidic hydrogen peroxide solution vessel
138 sodium hydroxide vessel
139, 140 solution injection mechanism
160: detection unit
161 LED
162 photomultiplier tube (PMT)
163 photomultiplier tube holder
164 cable
165 reaction vessel holder
171 main controller
172 DA converter
173 high voltage generator
174 logarithmic converter
175 AD converter
176 light emission condition conversion unit
177 constant current source
178 storage unit
179 display
R1 to R3 chamber
W1 to W3 window

The invention claimed is:
1. An automatic analysis apparatus, comprising:
a photomultiplier tube configured to detect light from a reaction vessel;
a light source; and
a controller programmed to determine an output signal of the photomultiplier tube in a case where the photomultiplier tube is irradiated with a first light from the light source, determine a target irradiation amount of the photomultiplier tube with a second light from the light source to lower a sensitivity of the photomultiplier tube based on the output signal, and continuously irradiate the photomultiplier tube with the second light until the target radiation amount is reached and the sensitivity of the photomultiplier tube reaches a target value.

2. The automatic analysis apparatus according to claim 1, wherein the controller is programmed to:
compare the target value with the output signal of the photomultiplier tube after irradiating the photomultiplier tube with the second light,
control irradiation of the photomultiplier tube with the second light continuously when the output signal is equal to or less than the target value, and
terminate the irradiation of the photomultiplier tube with the second light when the output signal is equal to or less than the target value.

3. The automatic analysis apparatus according to claim 1, wherein a light amount per unit time of the second light is at least 10 times greater than a light amount per unit time of the first light.

4. The automatic analysis apparatus according to claim 1, wherein the first light and the second light are emitted from the same light source.

5. The automatic analysis apparatus according to claim 1, further comprising:
a first chamber including the light source;
a second chamber adjacent to the first chamber and configured to hold the reaction vessel; and
a third chamber adjacent to the second chamber and including the photomultiplier tube,
wherein the controller is programmed to determine the output signal by irradiating the photomultiplier tube in the third chamber with the first light from the light source in the first chamber via the second chamber after the reaction vessel is evacuated from the second chamber.

6. The automatic analysis apparatus according to claim 5, further comprising:
a neutral density filter which is arranged between the light source and the second chamber and is configured to vary a transmittance of the light from the light source.

7. The automatic analysis apparatus according to claim 1, wherein the controller is programmed to correct measurement values of the photomultiplier tube.

8. The automatic analysis apparatus according to claim 1, wherein the first light is light emitted from a reagent.

9. The automatic analysis apparatus according to claim 1, further comprising:
a display screen configured to display a warning when the sensitivity of the photomultiplier tube after being irradiated with the first light is greater than the sensitivity of the photomultiplier tube before being irradiated with the first light.

10. The automatic analysis apparatus according to claim 1, further comprising:
a display screen configured to display a warning when a total value of irradiation amounts of the second light to the photomultiplier tube exceeds a certain value.

11. The automatic analysis apparatus according to claim 1, wherein the controller is programmed to interrupt the irradiation of the second light when an instruction to interrupt irradiation and lower the sensitivity of the photomultiplier tube is issued.

12. The automatic analysis apparatus according to claim 1, further comprising:
 a memory configured to store an irradiation amount of the second light to the photomultiplier tube.

13. A method for controlling an automatic analysis apparatus including a photomultiplier tube configured to detect light from a reaction vessel, a light source, and a controller programmed to determine an output signal of the photomultiplier tube, the method comprising steps of:
 irradiating the photomultiplier tube with a first light from the light source;
 determining the output signal of the photomultiplier tube in a case where the photomultiplier tube is irradiated with the first light;
 determining a target irradiation amount of the photomultiplier tube with a second light from the light source to lower a sensitivity of the photomultiplier tube based on the output signal; and
 continuously irradiating the photomultiplier tube with the second until the target radiation amount is reached and the sensitivity of the photomultiplier tube reaches a target value.

14. The method for controlling the automatic analysis apparatus according to claim 13, wherein the target value is compared with the output signal of the photomultiplier tube after irradiating the photomultiplier tube with the second light, and
 when the output signal is greater than the target value, irradiating the photomultiplier tube with the second light is continuously performed, and when the output signal is equal to or less than the target value, irradiating the photomultiplier tube with the second light is terminated.

* * * * *